July 17, 1951  R. H. SCHLUETER  2,560,992

METHOD OF MAKING LAST BLOCKS

Filed Oct. 24, 1946

INVENTOR.
Robert H. Schlueter
BY Murray, Sackhoff & Paddock
ATTORNEYS

Patented July 17, 1951

2,560,992

UNITED STATES PATENT OFFICE 2,560,992

METHOD OF MAKING LAST BLOCKS

Robert H. Schlueter, Cincinnati, Ohio, assignor to Vulcan Corporation, Cincinnati, Ohio, a corporation of Ohio Application October 24, 1946, Serial No. 705,392

4 Claims. (Cl. 144—309)

The present invention relates to an improved method for producing work blocks from which irregular forms are turned in a lathe, or the like, and is particularly directed to a method for making rough blocks from which lasts are made for use in the shoe making industry.

The principal object of the invention is to provide a method of producing last blocks in an efficient and economical manner by cutting a piece of stock in a novel manner to thereby reduce to a minimum the amount of waste stock cut away from the finished last blocks.

Another object of the invention is the provision of a method of cutting a piece of laminated stock whereby the maximum number of identically shaped alternate "right" and "left" last blocks are produced therefrom.

Other objects of the invention will become apparent as the description of my process proceeds, reference being had to the accompanying drawings for a clear understanding thereof.

Figure 1:
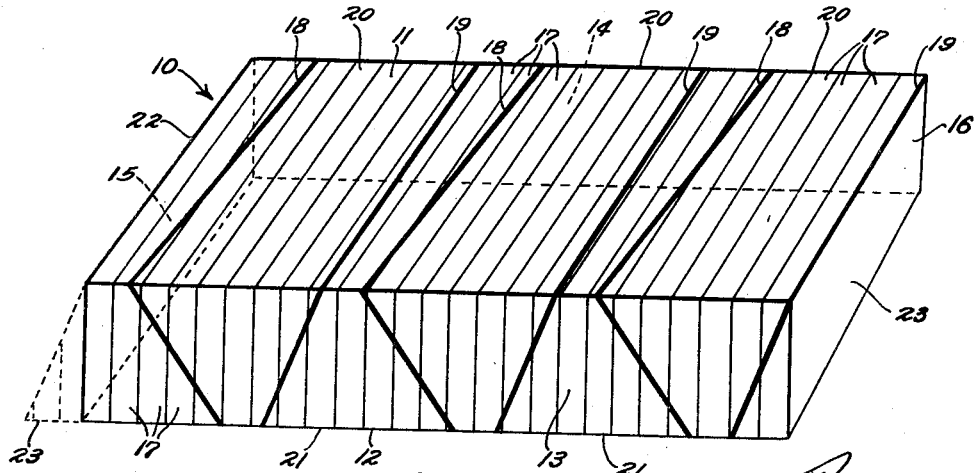
Fig. 1 is a perspective view of a piece of laminated stock from which the last blocks are made.
Figure 2:
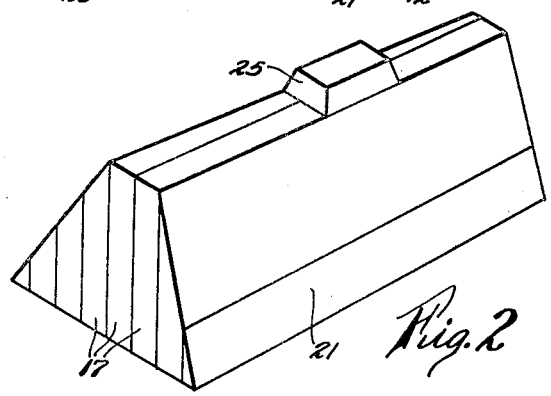
Fig. 2 is a perspective view of one of the last blocks cut from the piece of stock for use in turning a right foot last.
Figure 6:
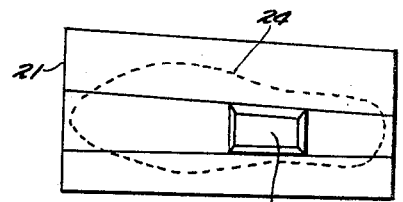
Fig. 6 is a top plan view of the last block illustrated in Fig. 3.
Figure 5:
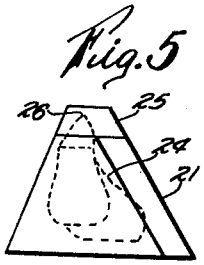
Fig. 5 is an end elevation of the rear of the block illustrated in Fig. 3.
Figure 4:
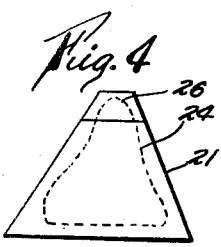
Fig. 4 is an end elevation of the front of the last block shown in Fig. 3.
Figure 3:
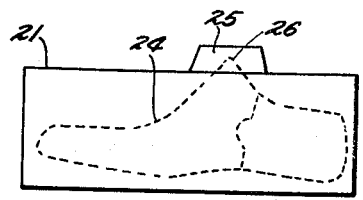
Fig. 3 is a side elevation of the last block illustrated in Fig. 2.

My method of making "right" or "left" last blocks includes as a preliminary step the shaping of a piece of stock 10 in the form of a parallelepiped. As illustrated in Fig. 1 the stock 10 has a top face 11 and a bottom face 12 disposed in spaced horizontal planes, a front face 13 and a rear face 14 lying in vertically disposed parallel planes, and spaced side faces 15 and 16 positioned in vertical planes at right angles to the planes of the front and rear faces. The stock is preferably built up from a number of strips of plain sawed lumber 17, which are preferably laminated vertically and extend laterally through the stock. The strips are adhesively joined together in face-to-face abutment as by a phenolic resin glue cured by the applicant of heat and pressure.

The piece of stock so formed is cut into a number of identically shaped, "right" and "left" last blocks, each having a prismoidal form, by passing a succession of oppositely inclined, non-intersecting saw cuts laterally through the stock, one alternate set of cuts 18 lying in equally spaced planes oblique with respect to the longitudinal edges of the stock and angularly positioned relative to the lateral edges of the stock whilst the remaining alternate set of cuts 19 are also equally spaced and lie in parallel planes oblique with respect to the said longitudinal edges of the stock, oppositely inclined relative to the first mentioned series of cuts, and parallel to the lateral edges of said stock. As most clearly indicated in Fig. 1, the alternate, oblique angles which the set of cuts 18 make with the horizontal faces 11 and 12 of the stock are less acute than the alternate, oblique angles which the set of cuts 19 make with the said horizontal faces whereby a greater extension or flare is produced on one side of the finished last blocks.

The series of cuts made through the stock produces spaced, inverted left foot last blocks 20 and alternately disposed therebetween are upstanding right foot last blocks 21 faced in the opposite lateral direction to said left foot last blocks. The end last blocks 22 and 23 are then brought together so that the vertical side faces 15 and 16 of the stock are in face abutment as indicated at the left hand side of Fig. 1 said blocks being adhesively joined together by application of pressure and heat to thereby produce an additional right foot last block.

The "right" and "left" last blocks so formed may thereafter be turned in the usual manner in a copying lathe to produce the finished last. As illustrated in Figs. 2-6 inclusive wherein right foot last 24 is illustrated in dotted lines, said block may be turned to produce all types of lasts except those having a high cone thereon. In the case of a high cone last, an extension piece 25 is adhesively joined substantially centrally to the right trapezoidal face of the block after it is cut from the stock so that the finished last will have a high cone 26 formed thereon.

Figure 7:
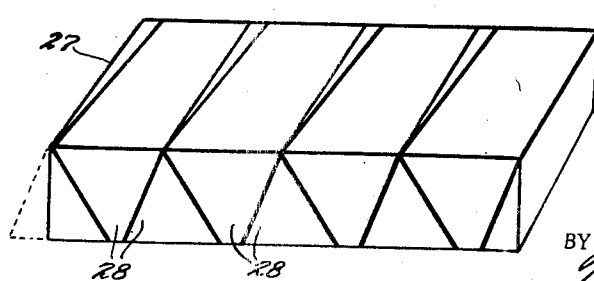
Fig. 7 is a perspective view of a modification of the piece of stock from which the last blocks are formed.

It is also contemplated that my method of making last blocks may be used on a piece of stock having a somewhat greater vertical extension than that shown in Fig. 1. This piece of stock is identified by the reference numeral 27 (Fig. 7) wherein the lateral cuts may intersect along diagonally opposed, longitudinal edges of the piece of stock. The last blocks 28 so formed have a substantially greater vertical extension than the block formed from the stock illustrated in Fig. 1 so that high cone lasts may be formed therefrom without the use of an extension piece 25. However, a greater amount of stock is lost in the turning of lasts formed from said piece of stock 27 and therefore I prefer to use the block 10 illustrated in Figs. 1-6 inclusive with the extension 25 formed thereon.

It will therefore be noted that the steps of my invention provide a means for producing an equal number of identically shaped "right" and "left" last blocks from a single piece of stock in an economical manner by reducing to a minimum the amount of stock material cut from the blocks in the subsequent lathe turning steps.

What is claimed is:

1. The method of making pairs of last blocks which consists of shaping a piece of stock into the form of a parallelepiped having a width approximating the length of the last blocks to be cut therefrom and a length dimension less than the total measurement of the said blocks across their greatest widths, passing a plurality of nonintersecting cuts laterally through the stock, one set of cuts lying in equally spaced planes oblique with respect to the longitudinal edges of the stock, the end cut of said set passing through a lateral edge of the stock, and the remaining set of cuts alternating with the first mentioned set and lying in oppositely inclined, equally spaced planes, oblique with respect to the longitudinal edges of the stock and angularly disposed relative to the lateral edges of the stock, and then securing together the end blocks so formed with their outer vertical surfaces in face abutment.

2. The method of making a number of identical last blocks which consists in building up from a number of strips of plain sawed lumber a piece of stock in the form of a rectangular parallelepiped with the laminations disposed vertically and extending laterally therethrough, passing a plurality of nonintersecting cuts laterally through the stock, one set of said cuts lying on equally spaced planes, oblique with respect to the longitudinal edges of the stock, the end cut passing through a lateral edge of the stock, and the remaining set of cuts alternating with the first mentioned set and lying on oppositely inclined, equally spaced planes oblique with respect to the longitudinal edges of the stock and angularly disposed relative to the lateral edges of the stock, and securing together the end blocks so formed with their outer vertical surfaces in face abutment whereby an equal number of "right" and "left" last blocks are produced.

3. The method of making pairs of last blocks which consists of shaping a piece of stock into the form of a parallelepiped having a width approximating the length of the last blocks to be cut therefrom and a length dimension less than the total measurement of the said blocks across their greatest widths, passing a set of non intersecting cuts laterally through the stock, said cuts lying in equally spaced planes oblique with respect to the longitudinal edges of the stock, and parallel to the transverse edges of the stock, and passing a second set of nonintersecting cuts laterally through the stock between the first mentioned set of cuts, the second set of cuts lying in oppositely inclined, equally spaced planes oblique with respect to the longitudinal edges of the stock and angularly disposed relative to the lateral edges of said stock.

4. The method of making pairs of last blocks which consists of shaping a piece of stock into the form of a parallelepiped having a width approximating the length of the last blocks to be cut therefrom and a length dimension less than the total measurement of the said blocks across their greatest widths, passing a set of nonintersecting cuts laterally through the stock, said cuts lying in equally spaced planes oblique with respect to the longitudinal edges of the stock, and parallel to the transverse edges of the stock, and passing a second set of nonintersecting cuts laterally through the stock between the first mentioned set of cuts, the second set of cuts lying in oppositely inclined, equally spaced planes oblique with respect to the longitudinal edges of the stock and angularly disposed relative to the lateral edges of said stock, the alternate angles formed between the second set of cuts and the longitudinal edges of the stock being more acute than the alternate angles formed by the first mentioned set of cuts and the said longitudinal edges.

ROBERT H. SCHLUETER.

REFERENCES CITED

The following references are of record in the file of this patent:

UNITED STATES PATENTS

| Number | Name | Date |
|---|---|---|
| 149,238 | Moore | Mar. 31, 1874 |
| 781,376 | Sorensen | Jan. 31, 1905 |
| 1,677,822 | Gulliford | July 17, 1928 |
| 1,965,341 | Houston | July 3, 1934 |

FOREIGN PATENTS

| Number | Country | Date |
|---|---|---|
| 574,031 | France | Mar. 21, 1924 |